(12) United States Patent
Hollis

(10) Patent No.: US 8,599,967 B2
(45) Date of Patent: *Dec. 3, 2013

(54) METHOD AND APPARATUS FOR TRAINING THE REFERENCE VOLTAGE LEVEL AND DATA SAMPLE TIMING IN A RECEIVER

(75) Inventor: Timothy M. Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/187,053

(22) Filed: Jul. 20, 2011

(65) Prior Publication Data

US 2011/0274215 A1 Nov. 10, 2011

Related U.S. Application Data

(63) Continuation of application No. 11/930,524, filed on Oct. 31, 2007, now Pat. No. 7,991,098.

(51) Int. Cl.
*H04L 7/00* (2006.01)
(52) U.S. Cl.
USPC .......................................... 375/317; 375/355
(58) Field of Classification Search
USPC .......................................... 375/317, 340, 355
See application file for complete search history.

(56) References Cited

U.S. PATENT DOCUMENTS

| | | | |
|---|---|---|---|
| 6,519,302 B1 | 2/2003 | Bruce et al. | |
| 6,760,676 B2 | 7/2004 | Nygaard, Jr. | |
| 6,914,947 B2 | 7/2005 | Persson et al. | |
| 7,036,053 B2 | 4/2006 | Zumkehr et al. | |
| 7,039,328 B2 | 5/2006 | Oomori et al. | |
| 7,336,749 B2 | 2/2008 | Garlepp | |
| 7,991,098 B2 * | 8/2011 | Hollis | 375/355 |
| 2005/0259774 A1 * | 11/2005 | Garlepp | 375/355 |

FOREIGN PATENT DOCUMENTS

TW 200801961 A 1/2008

OTHER PUBLICATIONS

A. Martin et al., "8Gb/s Differential Simultaneous Bidirectional Link with 4mV 9ps Waveform Capture Diagnostic Capability," IEEE Int'l Solid-State Circuits Conference, Paper 4.5 (2003).
G. Balamurugan et al., "Receiver Adaptation and System Characterization of an 8Gbps Source-Synchronous I/O Link using On-die Circuits in 0.13 μm CMOS," 2004 Symposium on VLSI Circuits Digest of Technical Papers, Paper 21.5 (2004).
Presentation entitled "DRAM-centric Write Data Alignment," presented to JEDEC Joint Electron Device Engineering Council) Task Group on GDDR5 in Feb. 2007.

* cited by examiner

*Primary Examiner* — David B. Lugo
(74) *Attorney, Agent, or Firm* — Schwegman, Lundberg & Woessner, P.A.

(57) ABSTRACT

Methods and apparatuses for calculating the location of an optimal sampling point for a receiver system are disclosed. In brief, a first method comprises determining a maximum voltage margin and a maximum timing margin of a received signal, and from these margins, determining an optimal sampling point, which includes a reference voltage level (Vref) and a relative sample phase. The location of the optimal sampling point is based on the locations of the sampling point of the maximum voltage margin and the sampling point of the maximum timing margin. A second method comprises establishing an initial sampling point, and then successively refining each of the voltage and timing components of the sampling point until an optimal sampling point is reached.

20 Claims, 11 Drawing Sheets

METHOD AND APPARATUS FOR TRAINING THE REFERENCE VOLTAGE LEVEL AND DATA SAMPLE TIMING IN A RECEIVER

CROSS REFERENCE TO RELATED APPLICATIONS

This is a continuation application of U.S. patent application Ser. No. 11/930,524, filed Oct. 31, 2007, to which priority is claimed, and which is incorporated herein by reference in its entirety.

FIELD OF THE INVENTION

Embodiments of the invention relate to optimizing a sampling point of a received signal in an integrated circuit such as a Dynamic Random Access Memory (DRAM).

BACKGROUND

Data transmission across high-speed chip-to-chip interconnects may take a number of forms. One example of a data transmission system 10 between high-speed components within a single semiconductor device or between two devices on a printed circuit board is represented in FIG. 1. In FIG. 1, a transmitter 12 (e.g., a microprocessor) sends data over one or more transmission channels 14a-14c (e.g., copper traces "on-chip" in a semiconductor device or on a printed circuit board) to a receiver 16 (e.g., another microprocessor or memory). Such transmission channels 14a-14c are referred to, for example, as "data buses," which allow one or more data signals to be transmitted from one device to another. Ideally, when a data signal is sent from a transmitter 12 to a receiver 16 across a channel 14, all of the energy in a transmitted pulse will be contained within a single time cell, which is often referred to as a unit interval (UI).

However, for a number of reasons, data signals are not received exactly as they were transmitted. While an ideal data signal may comprise a logic '1' ("high") value or a logic '0' ("low") value, a real data signal may become altered by the time it is detected at the receiver 16. Often, this is a result of effects of the channel in which the data signals are sent. Thus, real transmitters and real transmission channels do not exhibit ideal characteristics, and the effects of transmission channels are becoming increasingly important in high-speed circuit design. Due to a number of factors, including, for example, the limited conductivity of copper traces, the dielectric medium of the printed circuit board (PCB), and the discontinuities introduced by vias, the initially well-defined digital pulse will tend to spread or disperse as it passes over the transmission path.

For example, the use of multiple channels 14a-14c as shown in FIG. 1 may cause undesirable noise to be transferred from one data signal to another in the system 10 due to capacitive or inductive coupling between the channels 14a-14c, in a phenomenon referred to as crosstalk. Even when only a single channel 14 is present in a system 10, a transmitted signal may be distorted due to capacitive or inductive effects. In multi-channel systems 10, crosstalk occurs when transitioning data induces either a voltage (inductive crosstalk) or a current (capacitive crosstalk) on a neighboring line. Crosstalk from neighboring channels may alter the amplitude and timing characteristics of a bit of interest on a given channel. Crosstalk is most often addressed with careful channel routing techniques, which may include the placement of additional traces between the channels to provide shielding and to reduce inter-channel coupling.

Another phenomenon leading to the distortion of data bits on a channel is dispersion, which results from non-uniform group delay or other bandwidth limitations on a channel 14. This phenomenon results in the spreading of the energy of a pulse beyond the boundaries of the pulse UI, which results in energy from bits preceding or following a bit of interest in the bit sequence affecting the amplitude and/or timing of the bit of interest. This phenomenon is referred to as intersymbol interference (ISI) and is typically addressed through channel equalization. By either preceding or following the transmission channel with a frequency dependent circuit, whose transfer characteristics are the inverse of the channel characteristics, the original signal behavior may be restored.

Dispersion of a pulse is shown in FIG. 2A, where a single pulse of data 15a is sent by the transmitter 12 during a given UI (e.g., UI3). However, because of the effect of the channel 14, this data pulse becomes spread 15b over multiple UIs at the receiver 16, i.e., some portion of the energy of the pulse is observed outside of the UI in which the pulse was sent (e.g., in UI2 and UI4). This residual energy outside of the UI of interest (ISI) may thus perturb a pulse otherwise occupying either of the neighboring UIs.

ISI is shown more succinctly in the simulation of FIG. 2B, where two ideal pulses, $\pi_1$ and $\pi_2$, each occupy their own adjacent unit intervals. The resulting dispersed pulses, $P_1$ and $P_2$, represent simulated received versions of the ideal pulses after transmission at 10 Gb/s through a 6-inch copper trace in a standard printed circuit board material (FR4). The dispersion in each of these pulses overlaps the other pulse, as shown by the hatched portions in the drawings, which represent ISI. The larger pulse, $P_3$, represents the waveform that results when $P_1$ and $P_2$ are sent across the same channel with no intermediate delay, which is a common occurrence in the standard non-return-to-zero (NRZ) signaling format.

From the perspective of the receiver 16, one tool for quickly analyzing the effects of ISI and other noise on the signal is the eye diagram. An eye diagram is a plot that superimposes or overlays multiple data symbols from a data sequence. This provides a clear picture of how the data signal will change over time, and it also aids in determining the available margin for correct determination of the original digital state of each transmitted bit (i.e., that each transmitted bit is properly interpreted as a logic '1' value or a logic '0' value). When the eye closes, for example, due to reduced signal margins, the available data capture window shrinks and the probability of incorrectly interpreting the digital value of the received bit increases.

In high-speed systems, the ISI built up across the channel may be exacerbated or amplified in the receiver, if the receiver input buffer itself is bandwidth-limited or is intolerant to process variation. Thus, the technique of capturing the incoming data immediately as it enters the receiving chip, before it is passed through any circuitry, has been shown to provide the most margin for error in terms of the data capture mechanism, and as a result is becoming more commonplace in high performance systems.

To capture the incoming data in this manner, a sense-amplifier is commonly used, which allows the data entering the receiving chip to be immediately compared with a reference voltage (Vref), at a point in time corresponding to a trigger from an associated clock edge (sample clock). Depending upon the receiver characteristics, this methodology can be extremely tolerant to amplitude noise- and timing jitter-induced data eye closure (i.e., the shrinkage of the data capture window). However, this method is sensitive to the relative position of Vref and the sample clock edge (phase relationship between clock and data transitions) with respect to the opening of the data eye.

To reduce the probability of error, systems have begun to "train" Vref and the relative phase of the sampling clock edge in order to center the sample point (intersection of Vref and sample phase) within the capture window. Such training, which typically occurs during system startup, but may be repeated periodically throughout the operation of the system, may consist of interaction between the transmitter and receiver, or it may contained within the receiver, thus simplifying the interconnect. Such training may be carried out on a channel to channel basis (each receiver being trained independently), or the training may take place on a single channel with the resulting settings applied to several parallel receiver circuits to reduce area and power costs associated with instantiating several replicas of the training circuitry. In cases where only one channel is trained, and the resulting settings are applied to multiple channels, some additional receiver sensing margin is lost due to the channel-to-channel distinction inherent in real systems. In high speed systems, where the margins should be maximized, independent training of each channel is becoming more common. This can be done either by replicating the training circuitry at each receiver and performing the training of all channels simultaneously, or a single training circuit may be used, and time multiplexed between the various channels to train each channel, one at a time.

Trainability of Vref implies that the magnitude of Vref is controllable. This typically requires Vref to be generated from a digital-to-analog converter (DAC), which can be set to output a specified voltage level on an analog signal based on a digital input. Similarly, trainability of the sample clock timing or sample phase relative to the data edge requires control over the clock propagation delay. This is typically accomplished through the employment of variable delay-lines (VDLs), which may or may not require the additional incorporation of a delay-locked loop (DLL) or a phase-locked loop (PLL). Further resolution in the sample phase setting is accomplished through phase interpolation circuits, which are also often controlled digitally.

Thus, both Vref and the sample phase may be controlled digitally, and the range of each parameter may comprise several steps in voltage (Vref) or timing (sample phase), with the resolution of each step limited only by the level of complexity deemed appropriate for the system. The circuits required for these training operations, DACs, VDLs, DLLs, and PLLs, are well understood by one skilled in the art and are becoming more common in high performance systems. Thus, the circuitry itself is not considered a limiting factor when training Vref and the sample phase. Further, alternative methods for training, which may not require specific circuitry discussed here, are also possible.

One method for training Vref and the sample phase to determine an optimal sampling point is discussed with reference to FIG. 3A, which combines several cycles of data into an eye diagram, as discussed previously. It should be noted that the following descriptions are all discussed in terms of eye diagrams, which tend to imply that all of the information contained in the data eye is present at the outset of the training. On the contrary, the sampling of the data, as described throughout this specification, may be applied to real-time data and therefore information regarding the incoming signal is obtained gradually, and only by the end of the training sequence is all of the eye diagram information available. In FIG. 3A, an optimal sample point 28 is determined by maximizing the voltage margin (represented by the arrows 30) in the eye 22. This is done, in effect, by "painting" the eye, which comprises sampling the received signal as follows.

Essentially, at each available phase step, the error-free Vref range is determined by incrementing the Vref level, and at each incremented Vref level sampling the data for a certain number of cycles. The number of errors is computed for each Vref setting, at each phase step, and the error-free range is determined by counting the number of sequential Vref settings for which no errors were detected. The error-free range is then computed at each phase step, and from that data, the phase step which resulted in the largest error-free range is considered to provide the greatest voltage margin, (i.e., a distance from Vref to an error in the eye). As a result, the corresponding phase setting is adopted for real time operation and the Vref level is set to the midpoint of the corresponding error-free range (the setting for which an equal number of settings are above and below in the error-free range). At this point, the training is complete.

One shortcoming with this approach is that determining the optimal sampling point 28 by maximizing the voltage margin may result in offsetting the phase of the sampling point 28 from the optimal sampling phase, in this case the midpoint reference time 24. This is a common occurrence when maximizing the voltage margin, as the maximum voltage margin does not necessarily coincide with the maximum timing margin. Another shortcoming of this approach is the number of training cycles required by this method (i.e., the number of sampled cycles multiplied by the number of testable Vref/sample phase coordinates). In addition, the amount of data that must be stored throughout the training process can be problematic. At the very least, the process requires storing in memory the error-free range associated with each sample phase step. Further, in some implementations, this method may require storing the error count computed at each Vref/sample phase coordinate until the training is complete.

Another method used to determine an optimal sampling point 34 is shown in FIG. 3B. In FIG. 3B, the concept of "painting" the eye is more clearly illustrated. The inside of the eye 22 is "painted" with several identically-sized squares, with each square corresponding to an independent Vref/sample phase setting combination, which is sometimes referred to herein as a coordinate. The inner opening of the data eye is determined in the manner just described, with regard to FIG. 3A, but in this case, the optimal sampling point 34 is chosen to correspond to the most "central" coordinate (each being represented in the figure as a square). This is determined, for example, by locating a Vref/sample phase setting for which an equal number of error-free voltage settings are above and below, and for which an equal number of error-free phase settings are before and after in time (i.e., for each sample phase setting). Such a Vref/sample phase setting constitutes the optimal sampling point. After this point is determined, the training is complete.

Although determination of the optimal sampling point 34 according to FIG. 3B provides a more accurate sampling point than simply taking the widest voltage margin, as it also gives consideration to the timing margin, this method is computationally expensive, requiring numerous calculations to paint the eye 22 and determine the central sampling point 34, and further requires storing the error count at each testable Vref/sample phase coordinate, or at least storing the Vref and sample phase settings associated with each coordinate along the inner eye boundary, until the training is completed.

As was noted previously, the implementation of the above training algorithms takes place in the presence of real time data. In other words, data transitions are not guaranteed and the state of the data is not known in advance, though a replica of the training pattern may be stored in the receiving circuitry to simplify the process. It should also be pointed out that the term "optimal" is subjective. No method identifies a single "optimal" sampling point (i.e., a combined Vref and sample phase coordinate) in terms of providing for the lowest probability of error for all instances of a received signal. Rather, each method determines the best sampling point for a given amount of information obtainable by the receiver system.

Clearly, circuit designers of multi-Gigabit systems face a number of challenges as advances in technology mandate increased performance in high-speed systems. Correct detection of such high-speed signals becomes difficult as data rates and physical constraints on transmission circuits increase. Accordingly, an improved technique for determining an optimal sampling point for the data capture process would do so in a computationally efficient manner. The disclosed techniques achieve such results in a manner implemented in a typical computerized system or other circuit package.

DETAILED DESCRIPTION

Methods and apparatuses for calculating the location of an optimal sampling point for a receiver system are disclosed. In brief, in one or more embodiments according to the invention, a first method comprises determining a maximum voltage margin and a maximum timing margin of a received signal, and from these margins, determining an optimal sampling point, which includes a reference voltage level (Vref) and a relative sample phase. The location of the optimal sampling point is based on the locations of the sampling point of the maximum voltage margin and the sampling point of the maximum timing margin. A second method comprises establishing an initial sampling point, and then successively refining each of the voltage and timing components of the sampling point until an optimal sampling point is reached.

Figure 3A:
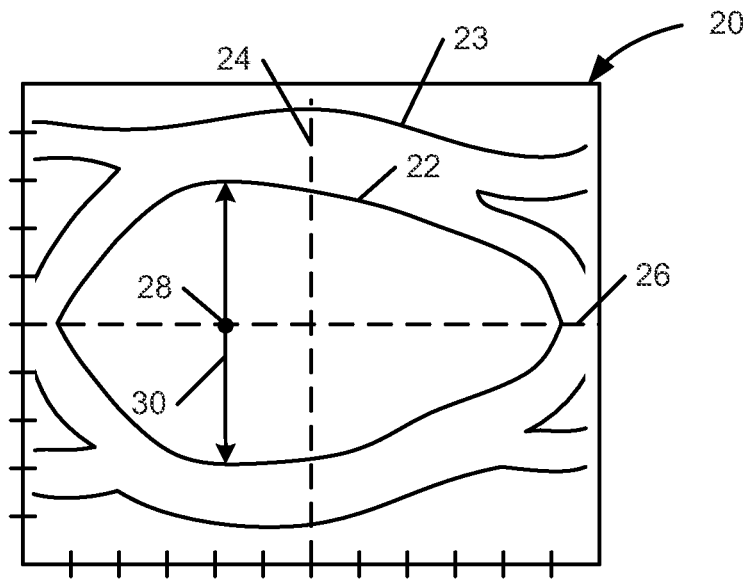
FIGS. 3A and 3B illustrate methods for calculating the location of a sampling point.
Figure 3B:
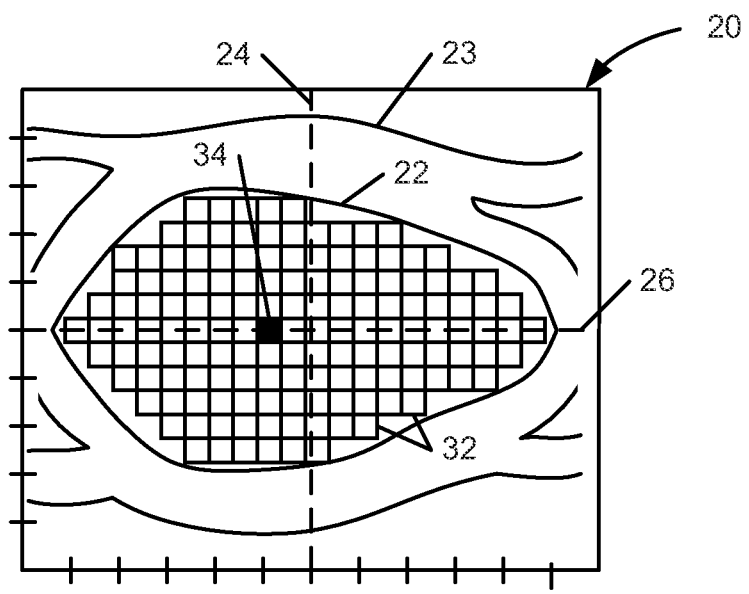
Figure 4A:
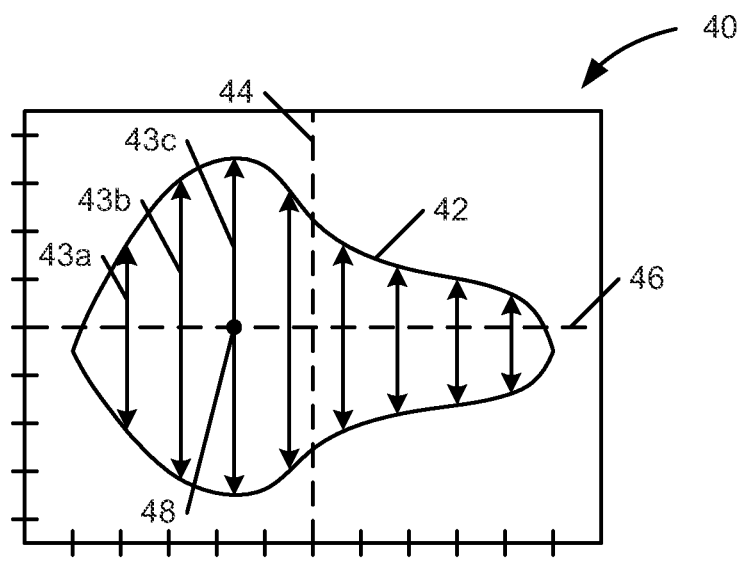
FIGS. 4A-4D illustrate a method for calculating the location of a sampling point in accordance with an embodiment of the invention.
Figure 4B:
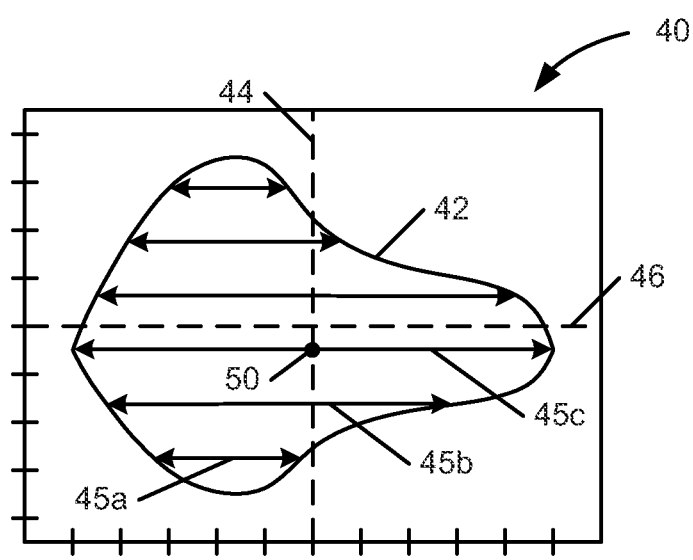
Figure 4C:
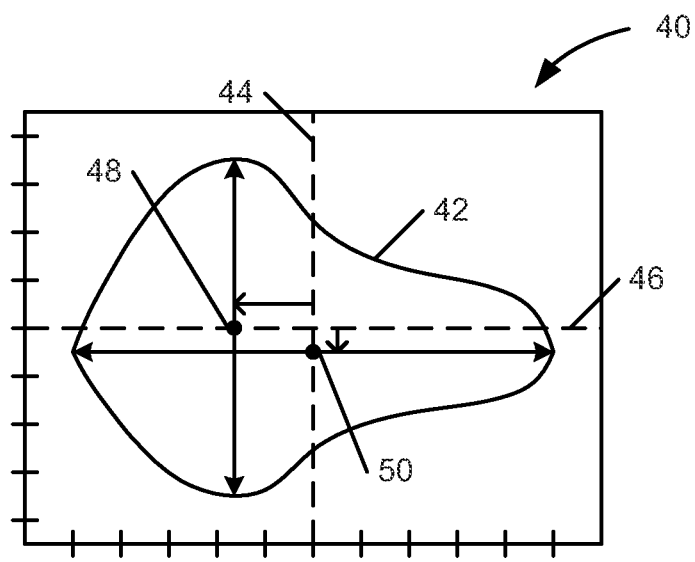
Figure 4D:
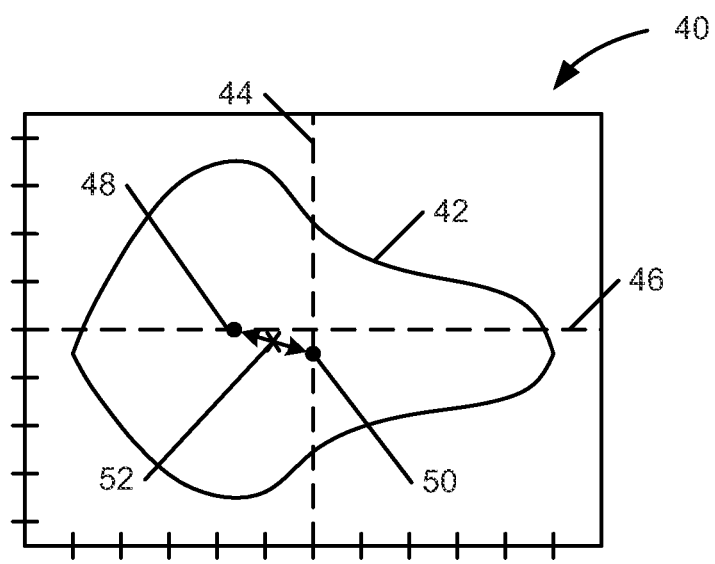
Figure 4E:
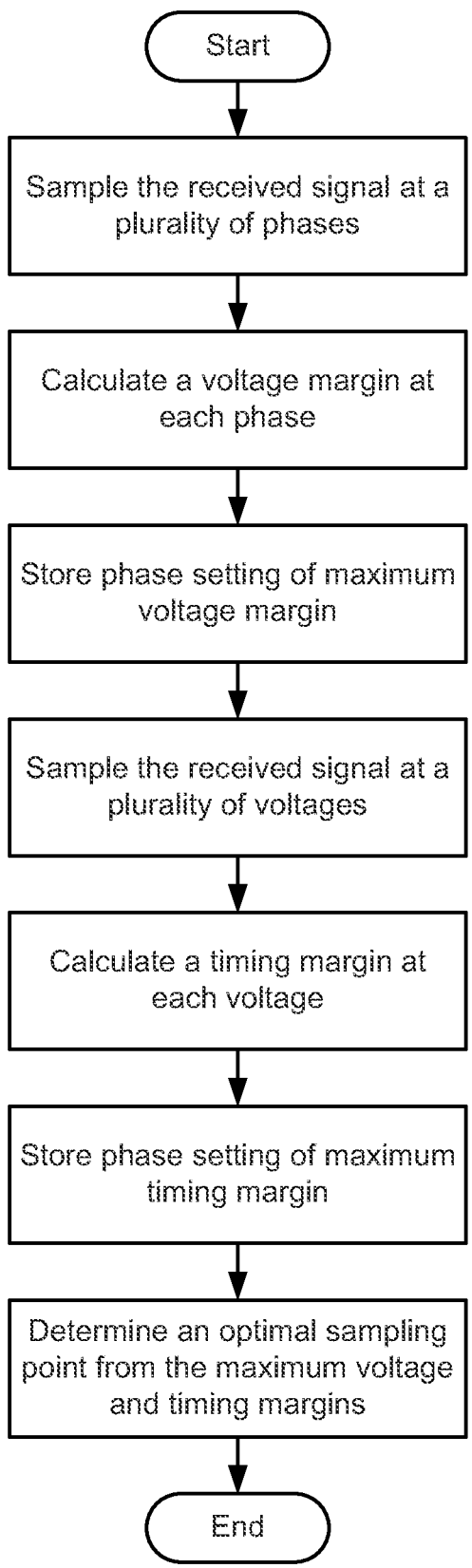
FIG. 4E illustrates a computer-implementable flow chart illustrating an embodiment of the invention.

FIGS. 4A-4D illustrate a first method for determining an optimal sampling point of a signal in accordance with one or more embodiments of the invention. Additionally, FIG. 4E illustrates a flow chart according to which an embodiment of the invention may be implemented. To simplify the FIGS. 4A-4D, the multiple samples as shown in FIG. 3 (e.g., 23) have been removed, and only the interior of the data eye 42 is illustrated.

According to the embodiment shown in FIGS. 4A-4D, initially, the interior of the data eye 42 is "painted" in essentially the same manner as described in the background. At each combined Vref/sample phase coordinate, the data is sampled over a certain number of cycles and the number of errors at each sampling point is computed. In other words, the sampled signal at each Vref/sample phase coordinate is compared to the current Vref at the point in time corresponding to the sample phase, and a determination is made as to whether an error has occurred. Based on the error-free region within the data eye opening, an optimal sampling point is chosen to simultaneously optimize the voltage margin and the timing margin. To reduce the number of required samples, the error-free Vref range (which is sometimes also referred to as a vertical opening) at each sample phase setting may be calculated, for example, by sampling at incrementally increasing or decreasing Vref settings in each direction from the midpoint reference voltage 46 until an error or a certain number of errors is detected. The error-free Vref ranges at several sample phase settings are represented by the vertical arrows 43a-43c.

After all of the phases have been sampled, a maximum voltage margin 43c, at one of the sample phase settings, is determined. In other words, the sample phase setting that results in the maximum error-free Vref range is identified as the setting of optimal phase. At this optimal phase, an associated optimal Vref setting is determined, and the coordinate of the optimal phase setting and the associated optimal Vref setting is stored. The coordinate comprising the sample phase and Vref level values, as shown in FIG. 4A, may be centered at the midpoint 48 of the maximum voltage margin 43c.

A similar process is repeated for several Vref level settings. That is, the interior of the data eye 42 is sampled at multiple Vref levels to calculate the error-free sample phase range at each Vref level (i.e., the number of error-free phase settings). Each error-free sample phase range is represented by a horizontal arrow (e.g., 45a-45c) at each Vref setting. After all Vref levels have been sampled and the corresponding error-free sample phase ranges have been obtained, a maximum timing margin is determined and stored. In other words, the Vref level setting that results in the maximum error-free sample phase range (i.e., the largest timing margin, determined as having the most error-free phase settings) is identified as the optimal Vref level for the signal. At this optimal Vref level, an associated sample phase setting is determined, centered at the midpoint 50 of the maximum timing margin. This Vref/sample phase coordinate is also stored.

Based on the sampling point 48 of the maximum voltage margin and the sampling point 50 of the maximum timing margin, an optimal sampling point 52 may be determined. The optimal sampling point 52 may be determined in a number of manners. For example, as shown in FIGS. 4C and 4D, the sampling points 48 and 50 may be averaged to determine an optimal sampling point. In other words, the voltage value of each sampling point 48, 50 is averaged, and the sample phase value of each sample point 48, 50 is also averaged. Such a method of averaging two coordinate points is well understood to one of ordinary skill in the art, and accordingly, is only briefly discussed here. In conclusion, the optimal sampling point 52 is derived from an optimal sample phase value for sampling a signal (i.e., the best time in a given UI to sample the signal), as well as an optimal reference voltage level for determining the logic value of a signal. The optimal sampling point 52 may then be used to sample future received signals in operations on the channel 14. While this method shares a similar level of computational complexity with prior art methods, it leads to a sampling point that simultaneously maximizes the voltage margin and the timing margin of the system.

Figure 5A:
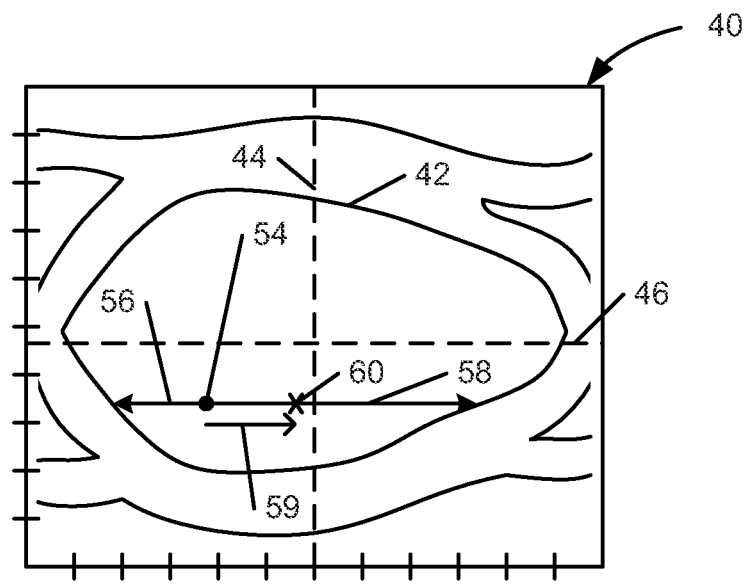
FIGS. 5A-5B illustrate a method for calculating the location of a sampling point in accordance with an embodiment of the invention.
Figure 5B:
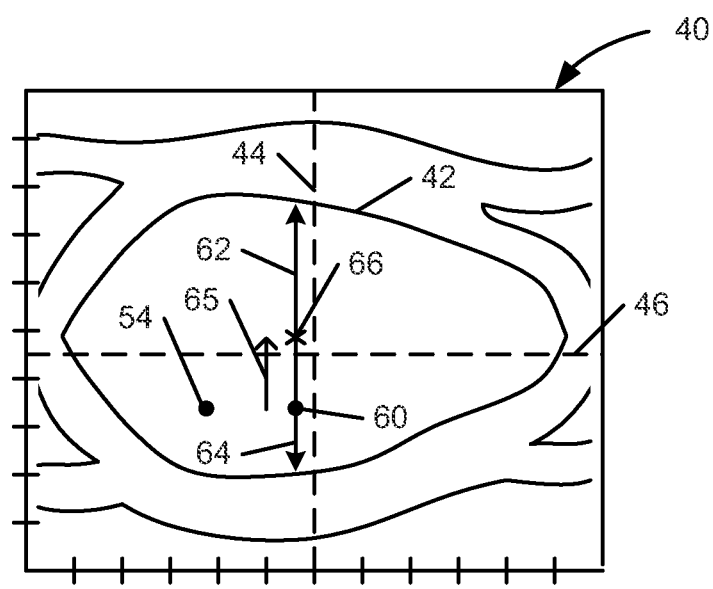
Figure 5C:
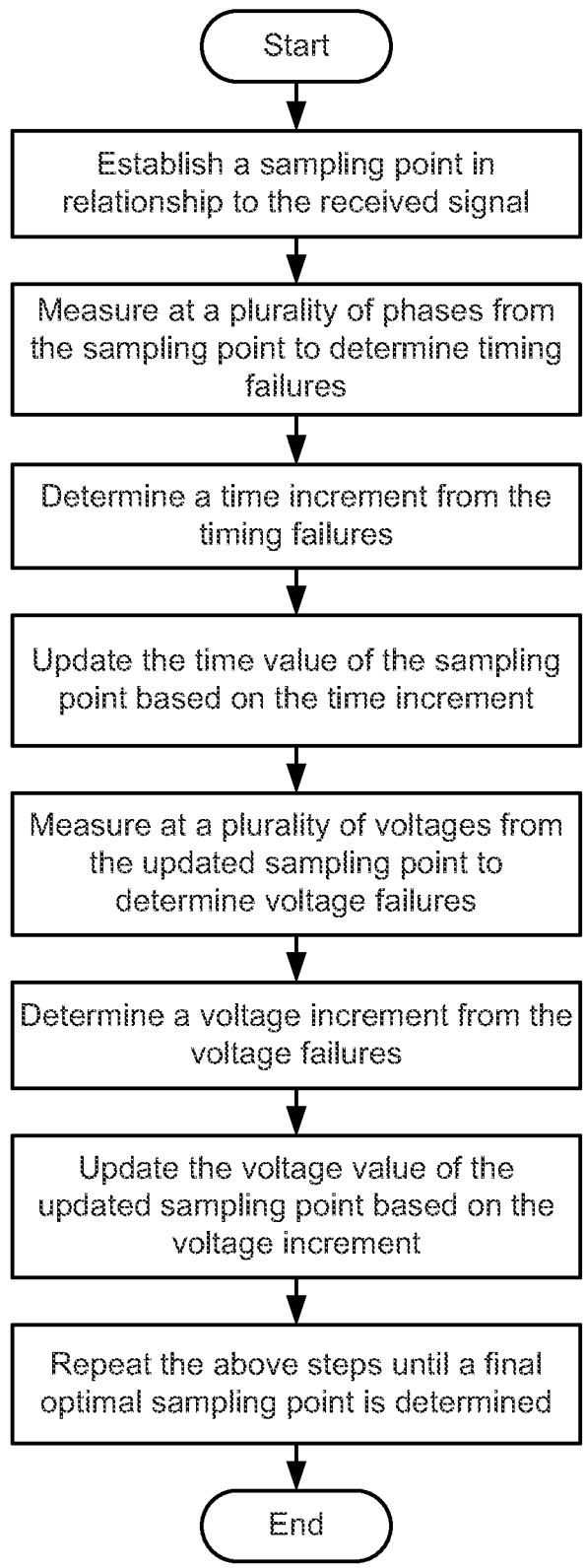
FIG. 5C illustrates a computer-implementable flow chart illustrating an embodiment of the invention.

FIGS. 5A-5B illustrate a second method for determining an optimal sampling point in accordance with one or more embodiments of the invention. In addition, FIG. 5C illustrates a flow chart according to which an embodiment of the invention may be implemented. In FIG. 5A, a data eye 42 of a received signal 15b is shown in a window 40. For reference, a midpoint sample phase 44 and a midpoint Vref level 46 of the data eye 42 are also shown, each with a dashed line. In brief, this technique comprises establishing an initial sampling point 54 within the data eye 42, and using measurements obtained at the sampling point 54 to adjust one or more components of the sampling point.

The process begins by sampling the data signal at a known Vref level and sample phase setting. Ideally, the initial setting combination will fall within the data eye. Whether this is true may be determined through sampling the signal over a certain number of cycles at the initial Vref/sample phase coordinate. If no errors (misinterpreted logic '1' and logic '0' values, etc.) are detected, the coordinate is assumed to fall within the data eye.

The initial sampling point 54, comprising a combined Vref level setting and a sample phase setting, may be chosen in a variety of ways. For example, an initial sampling point 54 may be randomly chosen and determined to fall within the eye based on the error calculation previously described. If errors occur, a new sampling point 54 could be chosen and the process repeated until a sampling point 54 is chosen which results in zero errors over a number of cycles. Regardless of the manner in which the initial sampling point 54 is derived, as long as the initial sampling point 54 is chosen such that it lies within the interior of the data eye 42 (error-free region), it is sufficient for the calculation of an optimal sampling point.

Initializing the Vref/sample phase coordinate to a point within the eye may be guaranteed through collaboration with the transmitter. Because clock-like signal patterns are known to result in zero ISI, if the transmitter begins the training sequence by transmitting a repeating '101010 . . .' pattern for a certain number of cycles, the clock and data edges may be aligned through phase detection circuitry. The initial Vref and sample phase setting may then be chosen by adding an amount of phase delay to the in-line clock timing and centering the Vref between the ideal signal swing levels (as specified in the system specification) to approach the center of the data eye. Once the initial Vref/sample phase coordinate has been established, the transmitter is free to transmit any arbitrary bit pattern.

From the initial sampling point 54, the horizontal distances 56, 58 are calculated from the current sample phase setting (i.e., the sample phase setting of the initial sampling point 54) to the first detected failure in each direction. This may be calculated in a number of manners. For example, if the incoming data is incrementally sampled at a number of sample phase intervals, the location of the first sample phase errors in each direction may be calculated by counting the number of incremental phase settings in each direction until the first detected failure is detected in a sample phase setting. Half of the difference between the horizontal distances 56, 58, which is represented by the arrow 59, indicates a sample phase increment that may be added to the current sample phase setting of the initial sample point 54. This corrected midpoint distance 59 represents a preferred location of the sample phase for the received signal 15b. Accordingly, this distance is added to the sample phase value of the initial sample point 54 to determine an updated sampling point 60. It should be noted that at this time, only the sample phase of the sampling point, and not the Vref level, is updated.

From the updated sampling point 60, a process similar to the above-described process is performed to update the Vref level of the updated sampling point 60. In other words, the vertical direction distances 62, 64, are calculated to determine a preferred Vref level setting for the sampling point 60. The vertical distances 62, 64 may be calculated from the updated sampling point 60 to the first detected failure (i.e., at the interior of the data eye 42) in each direction. As in the case with the updated sample phase value, half of the difference between the vertical distances 62, 64 (which is quantified by the number of error-free Vref level settings), represented by the arrow 65, indicates a Vref level increment that may be added to the current Vref level setting of the updated sampling point 60 to determine an updated sampling point 66.

The above process may be repeated any number of times to adjust the optimal sampling point. In one or more embodiments according to the invention, a certain number of iterations may be employed. Experimental simulation analysis shows that two iterations (i.e., two corrections in each of the sample phase and Vref directions) may be sufficient to obtain an optimal sampling point 66. In one or more alternative embodiments, a threshold may be set such that if an updated sampling point is within a certain number of Vref/sample phase settings from the current sampling point, then the process stops. In other words, if a difference between the current sampling point and the updated sampling point falls below a specified threshold, then the process stops.

Further, the above method may be modified in numerous manners. For example, although error-free sample phase ranges are determined before error-free Vref ranges to update the location of the sampling point, the error-free Vref ranges 62, 64 may be determined before the error-free sample phase ranges 56, 58. Further, although the above processes describe comparing Vref and the sample phase to the sampled signal and determining whether an error is detected, any number of errors may be considered allowable when determining error-free Vref ranges or error-free sample phase ranges.

Figure 1:
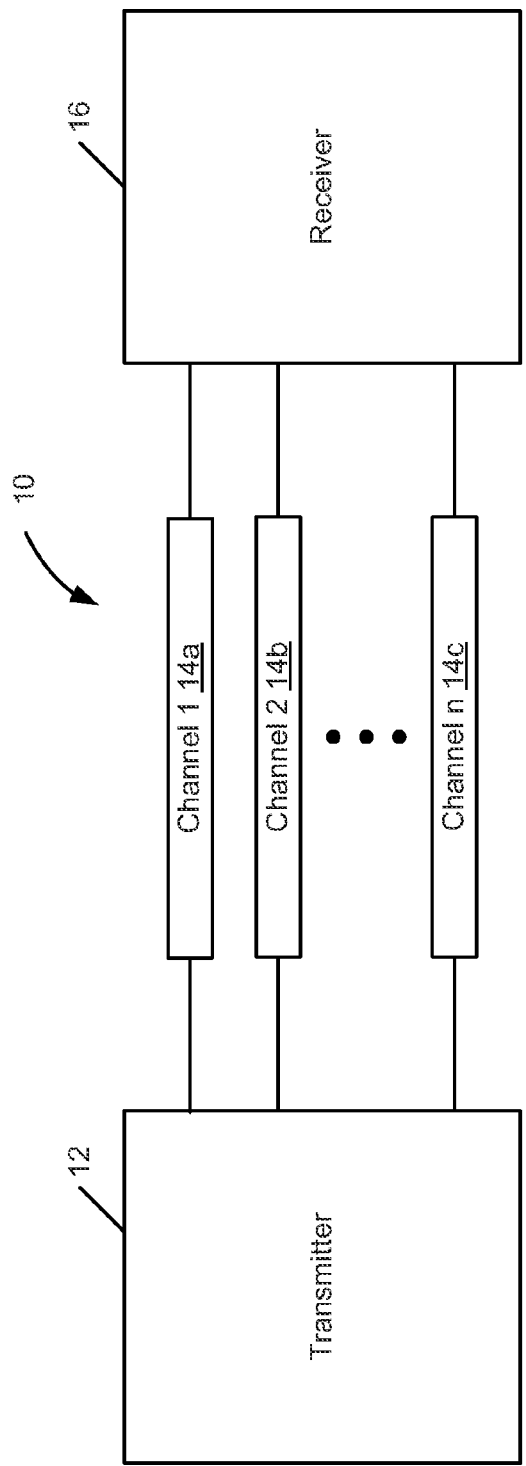
FIG. 1 illustrates a block diagram of a transmission system on a printed circuit board.
Figure 2A:
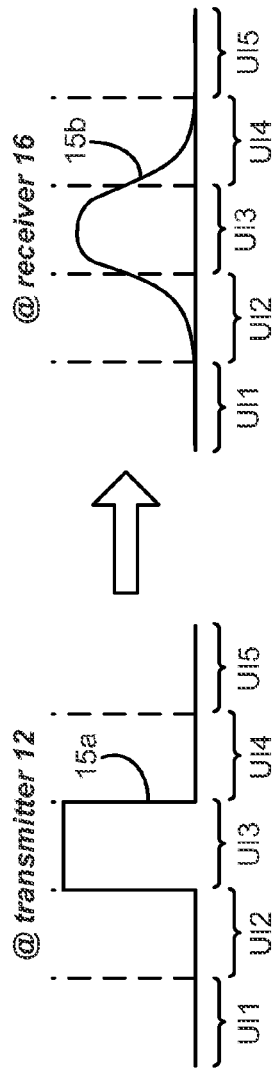
FIGS. 2A and 2B illustrate the effect of a transmission channel on pulses sent across the channel, and in particular show intersymbol interference (ISI).
Figure 2B:
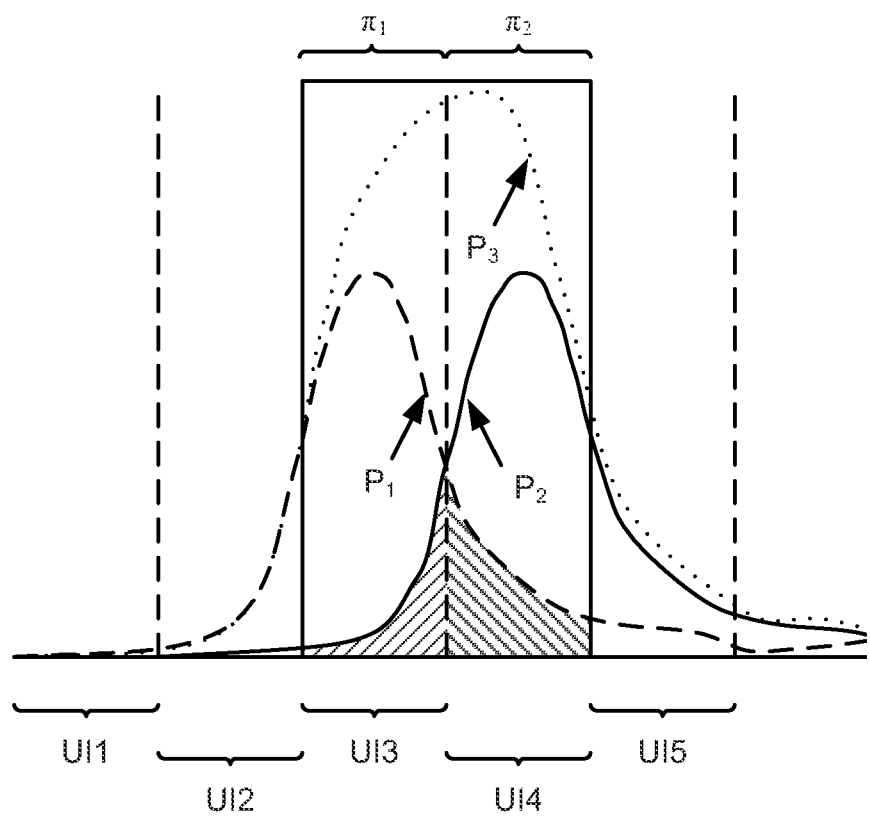
Figure 6:
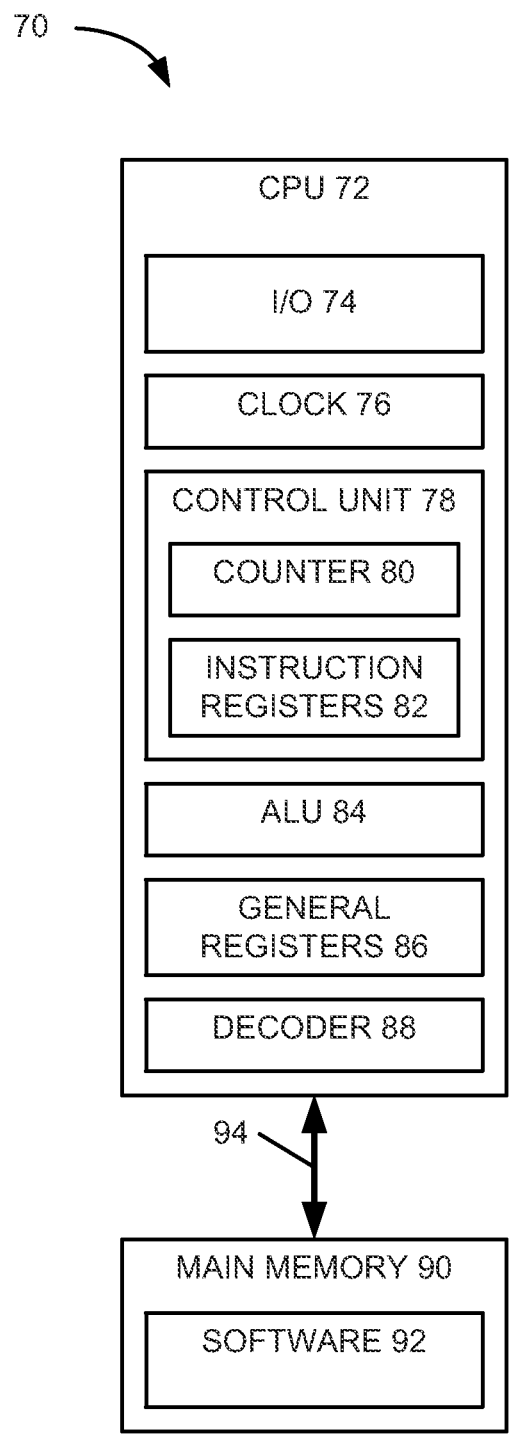
FIG. 6 illustrates a processor in which disclosed embodiments of the disclosed techniques may be implemented, and illustrates an embodiment of the techniques in computer-readable media.

FIG. 6 is a block diagram of an exemplary processor system 70 within which a set of instructions, for causing the machine to perform any one or more of the techniques described herein, may be executed. The processor system 70 may be present, for example, in the receiver 16 shown in FIG. 1. In alternative embodiments, the processor system 70 operates as a standalone device or may be connected (e.g., networked) to other processor systems.

The exemplary processor system 70 includes a processor 72 (e.g., a central processing unit (CPU)) and a main memory 90, which communicate with each other via one or more buses 94. The CPU 72 may further include an input/output (I/O) device 74, a clock 76, a control unit 78, an arithmetic logic unit (ALU) 84, registers 86, and an instruction decoder 88.

The control unit 78 includes a counter 80 and instruction registers 82. The main memory 90 includes a computer-readable medium 92 on which is stored one or more sets of instructions and/or data structures (e.g., software) embodying embodiments of the various techniques disclosed herein. The software 92 may also reside, completely or at least partially, within the CPU 72 during execution thereof by the CPU 72.

A CPU 72 suitable for the execution of a computer program include, by way of example, both general and special purpose microprocessors, and any one or more processors of any kind of digital computer. Generally, a processor will receive instructions and data from a read-only memory or a random access memory or both. Further, one skilled in the art will appreciate that while the devices in FIG. 6 are shown having particular relationships (e.g., the main memory 90 is separate from the CPU 72), the various devices may be combined as shown or have other configurations.

While the software 92 is shown in the exemplary embodiment of FIG. 6 to be a single medium, the term "computer-readable medium" should be taken to include a single medium or multiple media that store the one or more sets of instructions. The term "computer-readable medium" shall also be taken to include any medium that is capable of storing, encoding or carrying a set of instructions for execution by the machine and that cause the machine to perform any one or more of the methodologies of the disclosed techniques, or that is capable of storing, encoding or carrying data structures utilized by or associated with such a set of instructions. The term "computer-readable medium" shall accordingly be taken to include, but not be limited to, solid-state memories, optical and magnetic media such as discs, and carrier wave signals.

Figure 7:
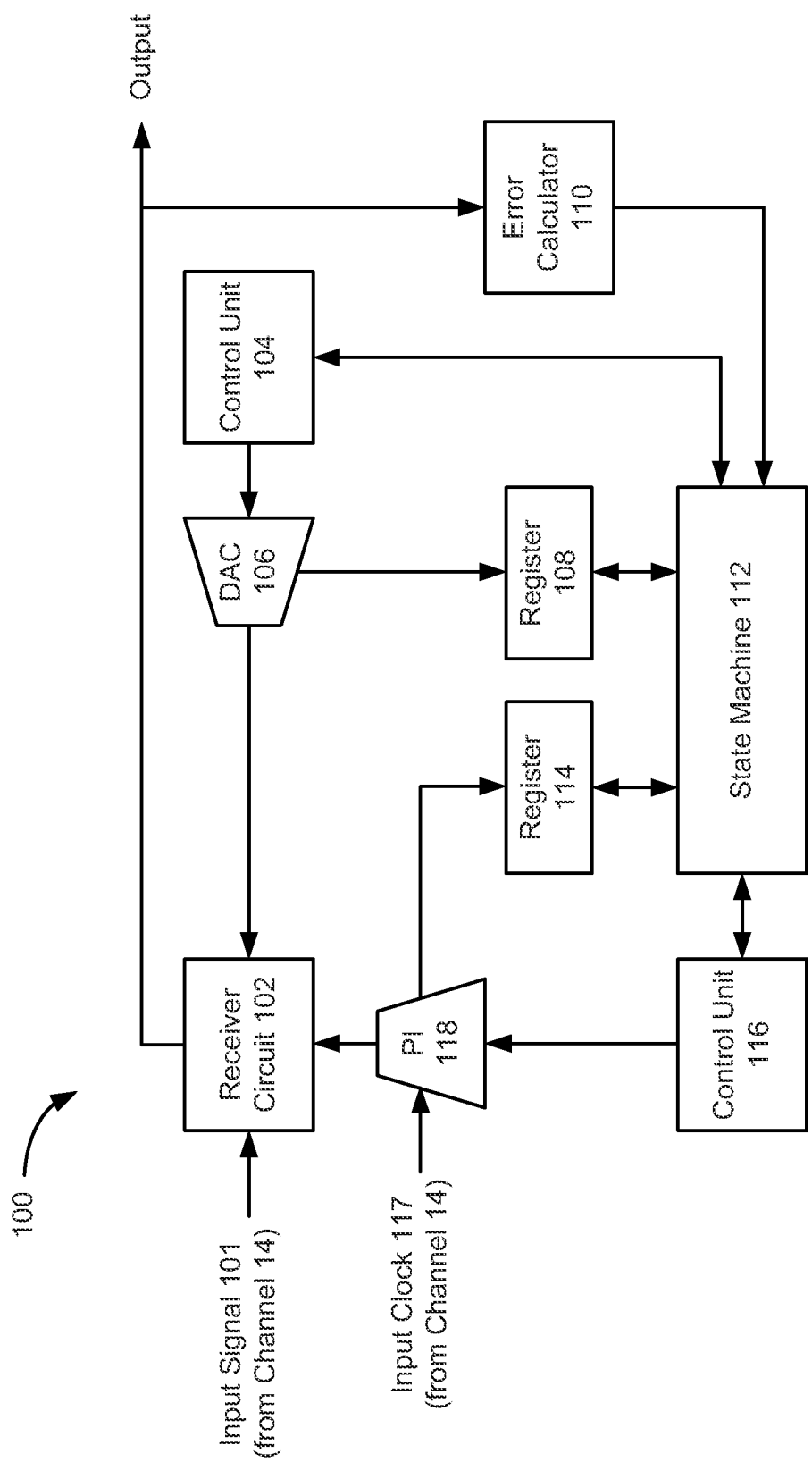
FIG. 7 illustrates a system in which disclosed embodiments of the disclosed techniques may be implemented, and illustrates an embodiment of the techniques in computer-readable media.

Embodiments of the disclosed techniques can also be implemented in digital electronic circuitry, in computer hardware, in firmware, in special purpose logic circuitry such as an FPGA (field programmable gate array) or an ASIC (application-specific integrated circuit), in software, or in combinations of the above, which again all comprise examples of "computer-readable media." One such system 100 is shown in FIG. 7.

In brief, the system 100 may be used to train the receiver circuit 102 to determine the most accurate location of a sample point for the input signal 101 that it receives. This may be accomplished, for example, by transmitting on the input signal 101 a known data sequence to the system 100. If the system 100 also knows the data sequence, the system 100 can make determinations as to when the input signal 101 is correctly or incorrectly interpreted. Incorrect interpretations lead to adjustment of the sample point. Such a system 100 may further be used in conjunction with the methods discussed above.

In FIG. 7, an input signal 101 is received by a receiver circuit 102, which compares the input signal 101 to Vref. The receiver circuit is controlled in part by a digital-to-analog converter (DAC) 106 and a Phase Interpolator (PI) 118. The DAC 106, controlled in turn by the control unit 104, supplies a voltage (Vref) to the receiver circuit 102 for comparison to the input signal 101. The PI 118, controlled by the control unit 116, supplies sample phase to the receiver circuit 102 to use when comparing Vref to the input signal 101. The registers 108, 114 may be used to temporarily store Vref and sample phase settings in the DAC 106 and PI 118, respectively.

It should be noted that the DAC 106 is not required to output a voltage for comparison with the data at the receiver circuit 102. For example, when the receiver circuit 102 is implemented as a differential sense-amplifier, a fixed Vref level may be applied to the comparison input, and the current through the differential legs of the sense-amplifier may be incrementally skewed by the DAC 106 in a way equivalent to incrementing the comparison voltage. Such an implementation may be used, for example, in a fully-differential (versus a single-ended) system.

After a comparison between the input signal 101 and Vref is made in the receiver circuit 102, the results are output and also sent to an error calculator 110. The error calculator 110 is provided with the known training sequence, and thus is capable of providing feedback to the state machine 112 regarding the sampled value of the input signal 101 determined by the receiver circuit 102. In combination with error signals sent from the error calculator 110 to the state machine 112, the state machine determines which Vref and sample phase settings used by the DAC 106 and PI 118 (in the registers 108, 114) result in correct and incorrect samples of the input signal 101. Accordingly, the state machine is then capable of adjusting Vref and the sample phase settings used in the receiver circuit 102, via the control units 104, 116, and the DAC 106 and PI 118.

While the components of the system 100 are shown as functional units, one skilled in the art will appreciate that several components are available that may be used in the system 100. For example, the receiver circuit 102 may be a single-ended or differential receiver. Similarly, the PI 118 may include a number of elements, including, for example, a delay locked loop, to control the timing of the sample phase in the receiver circuit 102.

Figure 8:
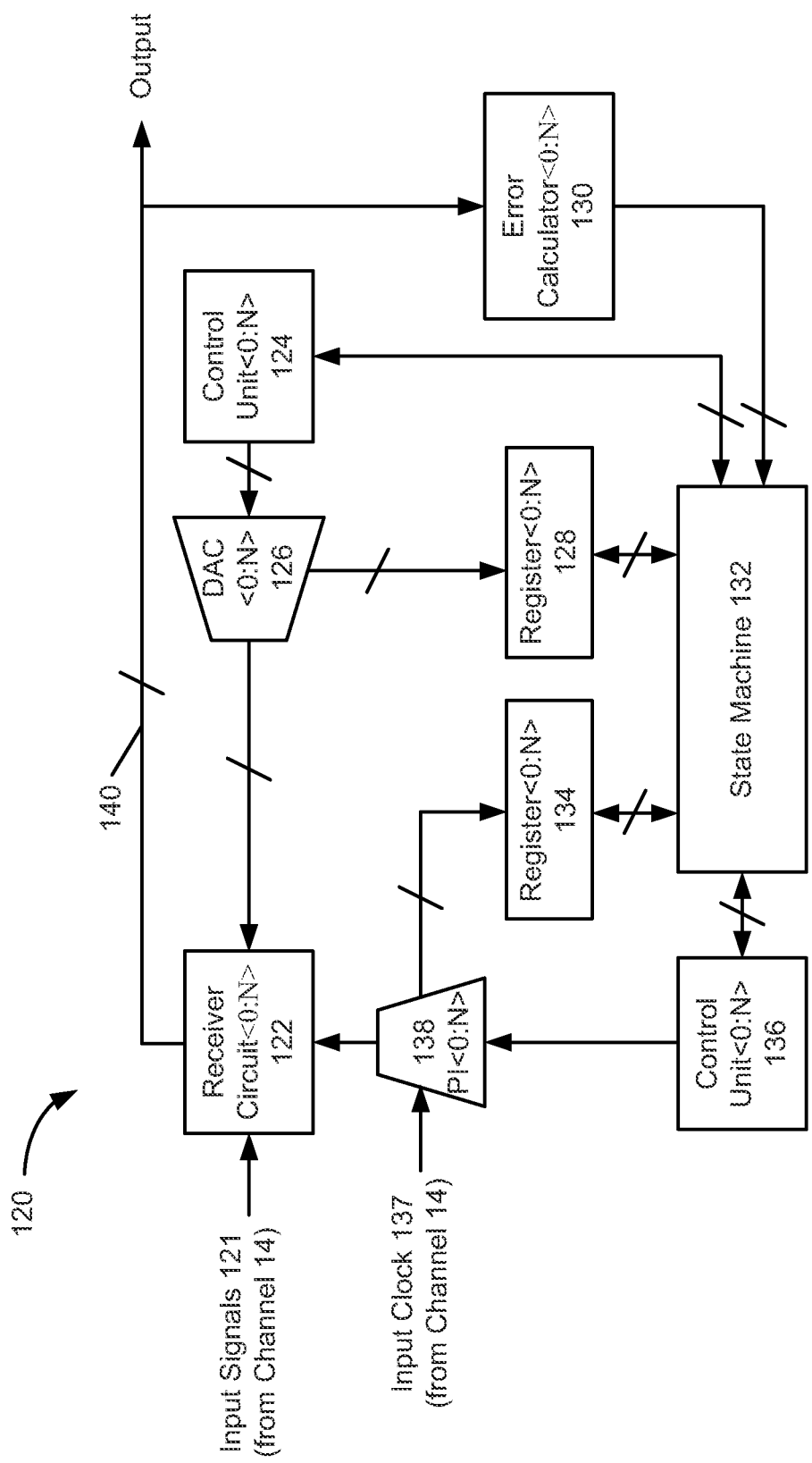
FIG. 8 illustrates a system in which disclosed embodiments of the disclosed techniques may be implemented, and illustrates an embodiment of the techniques in computer-readable media.

As described previously, the training circuit may be shared by each channel on the bus or replicas of certain components of the training system may be instantiated locally at each receiver. Such a case is illustrated in FIG. 8. To provide simultaneous and independent tuning of each channel on the bus, the DAC 106, PI 118, control units 104, 116, and registers 108, 114 shown in FIG. 7 become DAC<0:N> 126, PI<0:N> 138, control units<0:N> 124, 136, and registers 128, 134, as shown in FIG. 8, where N equals the number of channels on the bus 140. Control of these components in system 120 may be accomplished simultaneously from a single state machine 132. Other devices, such as the receiver circuit<0:N> 122 and error calculator<0:N> 130, function as described above, with the additional functionality of being capable of handling multiple input signals 121 and input clocks 137, from the channels 14, on the bus 140.

When implemented as software, such software can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Embodiments according to the invention include several advantages. For example, rather than repeating the error calculation at every testable Vref sample phase coordinate, the error may be calculated along specific coordinate axes, significantly reducing the number of training cycles that must be transmitted and the associated calibration time. The memory storage requirements of embodiments according to the invention are also relaxed, as only a past updated sampling point coordinate and error counts along the current axis are stored from step to step through the process.

As an advantage of the various disclosed techniques, a balance may be found between maximizing a voltage margin and a timing margin of a received signal. Further, the amount of processing and memory necessary to determine a voltage or timing margin may be reduced. Further, a number of calibration steps (i.e., iterations to an optimal value) may be reduced. In other words, an optimal sampling point may be determined from less data and with less computational complexity than with other methods.

While preferred embodiments of the invention have been disclosed, it should be understood that the disclosed circuitry can be achieved in many different ways to the same useful ends as described herein. In short, it should be understood that the inventive concepts disclosed herein are capable of many modifications. To the extent such modifications fall within the scope of the appended claims and their equivalents, they are intended to be covered by this patent.

What is claimed is:

1. A method for optimizing a sampling point of a signal in a receiver, comprising:
    sampling the signal at a plurality of phases and at a plurality of reference voltage levels;
    determining a maximum voltage margin and a maximum timing margin from the sampled signal; and
    determining an optimal sampling point using the maximum voltage margin and the maximum timing margin, wherein the optimal sampling point comprises an optimal phase value and an optimal reference voltage level, the maximum voltage margin occurs at a first phase value and has a midpoint reference voltage value, and wherein the maximum timing margin occurs at a first reference voltage level and has a midpoint phase value, and wherein the optimal phase value is determined using the first phase value and the midpoint phase value, and wherein the optimal reference voltage level is determined using the first reference voltage level and the midpoint reference voltage value.

2. The method of claim 1, wherein the optimal phase value comprises an average of the first phase value and the midpoint phase value, and wherein the optimal reference voltage level comprises an average of the first reference voltage level and the midpoint reference voltage value.

3. The method of claim 1, the maximum voltage margin comprises a maximum number of error-free reference voltage levels, and wherein each reference voltage level has at least one error-free phase value.

4. The method of claim 1, wherein the maximum timing margin comprises a maximum number of error-free phase values, and wherein each phase value has at least one error-free reference voltage level.

5. The method of claim 1, wherein determining the maximum voltage margin comprises determining a voltage margin at each of a plurality of phases, and wherein determining the maximum timing margin comprises determining a timing margin at each of a plurality of reference voltage levels.

6. The method of claim 5, wherein determining the voltage margins at each of the plurality of phases comprises determining a high and low voltage at which errors occur in the sampling.

7. The method of claim 5, wherein determining the timing margin at each of the plurality of reference voltage levels comprises determining a high and low time at which error occur in the sampling.

8. The method of claim 1, wherein the signal comprises a pre-determined training sequence.

9. A system for optimizing a sampling point of a signal, comprising:
    a receiver for sampling the signal at a plurality of sampling points, each sampling point comprising a phase value and a reference voltage level;
    an error calculator for determining whether an error exists at each sampling point: and
    logic circuitry for receiving an output of the error calculator, wherein the logic circuitry sets the reference voltage level of the sampling point in accordance with an optimal reference voltage level, wherein the logic circuitry sets the phase value of the sampling point in accordance with an optimal phase value, wherein the logic circuitry determines the optimal reference voltage level and the optimal phase value based on a maximum voltage margin and a maximum timing margin, wherein the maximum voltage margin occurs at a first phase value and has a midpoint reference voltage value, and the maximum timing margin occurs at a first reference voltage level and has a midpoint phase value, and wherein the optimal phase value is determined using the first phase value and the midpoint phase value. and wherein the optimal reference voltage level is determined using the first reference voltage level and the midpoint reference voltage value, 10. The system of claim 9, wherein the logic circuitry comprises a digital-to-analog converter for setting the reference voltage level of the sampling point.

11. The system of claim 9, wherein the logic circuitry comprises a phase interpolator for setting the phase values of the sampling point.

12. The system of claim 11, wherein the phase interpolator further receives an input clock.

13. The system of claim 9, wherein the logic circuitry comprises a state machine.

14. The system of claim 9, wherein the receiver comprises a differential sense amplifier.

15. A system for optimizing receipt of a plurality of signals in parallel, comprising:
    a plurality of receivers each for receiving one of the signals, each receiver sampling its signal at a plurality of sampling points, each sampling point comprising a phase value and a reference voltage level;
    a plurality of error calculators each associated with one of the receivers, wherein each error calculator determines whether an error exists at each sampling point; and
    logic circuitry for receiving an output of each error calculator, wherein the logic circuitry independently sets the reference voltage level of the sampling point of each receiver of the plurality of receivers with an optimal reference voltage level, wherein the logic circuitry independently sets the phase value of the sampling point of each receiver with an optimal phase value, and wherein for each receiver of the plurality of receivers, the logic circuitry determines the optimal reference voltage level and the optimal phase value based on a maximum voltage margin and a maximum timing margin, wherein the maximum voltage margin occurs at a first phase value and has a midpoint reference voltage value, and the maximum timing margin occurs at a first reference voltage level and has a midpoint phase value, and wherein the optimal phase value is determined using the first phase value and the midpoint phase value, and wherein the optimal reference voltage level is determined using the first reference voltage level and the midpoint reference voltage value.

16. The system of claim 15, wherein the logic circuitry comprises a plurality of digital-to-analog converters for setting the reference voltage levels of the sampling points for each of the plurality of receivers.

17. The system of claim 15, wherein the logic circuitry comprises a plurality of phase interpolators for setting the phase values of the sampling points for each of the plurality of receivers.

18. The system of claim 17, wherein each phase interpolator or further receives an input clock.

19. The system of claim 15, wherein the logic circuitry comprises a state machine.

20. The system of claim 15, wherein each receiver comprises a differential sense amplifier.

* * * * *

UNITED STATES PATENT AND TRADEMARK OFFICE
CERTIFICATE OF CORRECTION

PATENT NO. : 8,599,967 B2
APPLICATION NO. : 13/187053
DATED : December 3, 2013
INVENTOR(S) : Timothy M. Hollis Page 1 of 1

It is certified that error appears in the above-identified patent and that said Letters Patent is hereby corrected as shown below:

In the Claims

Column 11, line 31, in Claim 3, delete "the" and insert -- wherein the --, therefor.

Column 11, line 50, in Claim 8, delete "claim l," and insert -- claim 1, --, therefor.

Column 11, line 58, in Claim 9, delete "point: and" and insert -- point; and --, therefor.

Column 12, line 8, in Claim 9, delete "value." and insert -- value, --, therefor.

Column 12, line 11, in Claim 9, delete "value," and insert -- value. --, therefor.

Column 12, line 58, in Claim 18, delete "or further" and insert -- further --, therefor.

Signed and Sealed this
Twenty-fifth Day of March, 2014

Michelle K. Lee
*Deputy Director of the United States Patent and Trademark Office*